United States Patent [19]
Horie

[11] Patent Number: 5,506,921
[45] Date of Patent: Apr. 9, 1996

[54] OPTICAL FIBER TERMINAL CONNECTOR APPARATUS

[75] Inventor: Kenzo Horie, Yokohama, Japan

[73] Assignee: Matsushita Electric Industrial Co., Ltd., Osaka, Japan

[21] Appl. No.: 294,842

[22] Filed: Aug. 29, 1994

[30] Foreign Application Priority Data

Sep. 3, 1993 [JP] Japan ..................... 5-219670

[51] Int. Cl.⁶ ..................... G02B 6/36
[52] U.S. Cl. ............... 385/53; 385/55; 385/76; 385/77; 385/88; 385/139
[58] Field of Search .................. 385/53, 75, 76, 385/88, 89, 147, 55, 58, 77, 139

[56] References Cited

U.S. PATENT DOCUMENTS

| | | | |
|---|---|---|---|
| 3,806,225 | 4/1974 | Codrino | 385/88 X |
| 4,439,006 | 3/1984 | Stevenson | 385/88 X |
| 4,721,355 | 1/1988 | Gould | 385/76 |
| 4,737,008 | 4/1988 | Ohyama et al. | 385/88 X |
| 4,756,593 | 7/1988 | Koakutsu et al. | 385/53 X |
| 4,767,168 | 8/1988 | Grandy | 385/53 |
| 4,869,566 | 9/1989 | Juso et al. | 385/53 |
| 5,005,939 | 4/1991 | Arvanitakis et al. | 385/53 |
| 5,048,914 | 9/1991 | Sneddon | 385/53 |
| 5,136,672 | 8/1992 | Mulholland et al. | 385/53 |

FOREIGN PATENT DOCUMENTS

| | | | |
|---|---|---|---|
| 64-73927 | 3/1989 | Japan | H04B 9/00 |
| 4-69283 | 11/1992 | Japan | F16B 1/02 |
| 5-108522 | 4/1993 | Japan | G06F 13/00 |

*Primary Examiner*—Brian Healy
*Attorney, Agent, or Firm*—Pollock, Vande Sande & Priddy

[57] ABSTRACT

An optical connector apparatus is provided. This connector apparatus includes a host connector connectable to a host device, a signal cable connected to the host connector, and a terminal connector connected to the host connector through the signal cable. The terminal connector is designed to be joined to a terminal device and includes a casing having a pair of hooks formed on both sides thereof. Each hook is designed to engage a recessed portion formed in a casing of the terminal device for establishing tight mechanical engagement between the terminal connector and the terminal device.

8 Claims, 6 Drawing Sheets

OPTICAL FIBER TERMINAL CONNECTOR APPARATUS

BACKGROUND OF THE INVENTION

1. Technical Field of the Invention

The present invention relates generally to a cable connector for connecting a portable terminal device and a computer system to transmit and/or receive information signals, and more particularly to an optical connector apparatus having an improved structure of a terminal connector for easy connection to a terminal device.

2. Background Art

Present day portable terminal devices require a small lightweight dripproof structure for easy startability. In addition, a connector cable is usually used to connect a portable device and a host computer to establish transmission of information therebetween. It is necessary to increase the durability of the connector cable against wear due to frequent connection and disconnection of connector terminals. Particularly, in recent years, terminal equipment for optical communication become used widely. Optical connector cables are thus required for establishing communication to a host computer, for example.

FIG. 8 shows a conventional optical connector cable assembly. This cable assembly includes generally a host connector 71, a signal cable 72, and a terminal connector covered with upper and lower casings 73 and 74. The host connector 1 is designed to couple with a host computer. The terminal connector is designed as an attachment to a portable terminal device, and includes four protrusions 76, a pair of magnetic plates 77, and a filter 75 for transmission and reception of optical signals. The protrusions 76 are arranged around the filter 75 in a diametrically opposed relation. Internally, a permanent magnet 80 is, as shown in FIG. 9, interposed between the magnetic plates 77. An LED substrate 78 which has disposed thereon a plurality of LEDs for producing optical-signals, is arranged behind the filter 75. A main circuit board 79 is provided for converting electric signals into optical signals, and is electrically connected to the signal cable 72 and the LED substrate 78.

FIG. 10 shows a socket portion of a portable terminal device 90 which includes a filter 92, grooves 91 engageble with the protrusions 76 of the connector terminal, and optical conductive holes 93 for transmission and reception of optical signals. The socket shown is made of a metallic material other than the optical conductive holes 93.

The connection of the optical connector cable to the terminal device 90 is accomplished by fitting the protrusions 76 into the grooves 91 to achieve proper positional relation therebetween. The magnetic plates 77 of the optical connector cable then attract the metal-made filter 92 of the terminal device 90 under magnetic force produced by the permanent magnet 80 to establish engagement between the terminal connector and the terminal device.

The above prior art optical connector cable is, however, encountered a drawback in that since the connection to the terminal device is established under the magnetic force, the degree of the connection is low. Thus, the connection can be easily released by pulling the signal cable or when any impact is applied to the casings of the optical connector cable. In addition, magnetic mediums such as a floppy disc or a memory card have become used frequently in offices. These magnetic mediums are subject to change in their functions near magnetic members. Therefore, special care should be taken in handling the prior art optical connector cable. Further, during assembling of the optical connector cable, the permanent magnet to be incorporated therein can attract other metallic component parts such as a screw or assembling tools such as a screw driver, resulting in troublesome assembling operations.

SUMMARY OF THE INVENTION

It is therefore a principal object of the present invention to avoid the disadvantages of the prior art.

It is another object of the present invention to provide an optical connector cable assembly which is capable of establishing tight engagement with a terminal device without use of a permanent magnet.

According to one aspect of the present invention, there is provided an optical connector apparatus which comprises a host connector connectable to a host device, a signal cable connected to the host connector, and a terminal connector connected to the host connector through the signal cable. The terminal connector is designed to be joined to a terminal device and includes a casing having hook means formed thereon. The hook means is designed to establish engagement with the terminal device.

In the preferred mode, the hook means has a barbed portion which projects from the casing of the terminal connector to engage a recessed portion formed in the terminal device. The hook means is pivotably supported by the casing of the terminal connector for facilitating engagement of the barbed portion with the recessed portion of the terminal device.

Additionally, the hook means may be supported pivotably about a shaft secured to a side of the casing. An end of the hook means is urged by a spring outward of the casing and includes a stopper portion engaging a side wall of the casing to restrict pivotal movement of the hook means.

The hook means includes a pair of hook members formed on both sides of the casing of the terminal connector.

A plurality of protrusions are further formed on an end surface of the casing of the terminal connector to align an optical signal transmitting/receiving terminal of the terminal connector with an optical signal transmitting/receiving terminal of the terminal device.

A pair of probes are further provided which work as charging terminals. Each probe is elastically supported by the casing of the terminal connector so as to allow axial displacement for establishing engagement with charging terminals of the terminal equipment under a given degree of contact pressure.

Each probe includes a pointed portion, a shaft, and a stopper portion formed on an end of the shaft. The pointed portion is urged by a spring outward of the casing, while the stopper portion restricts outward axial displacement of the pointed portion so as to at least party project the pointed portion from the casing.

A sensor means is further provided for detecting the engagement of the terminal connector with the terminal device. The sensor means is provided with a probe and an optical sensor. The probe is supported by the casing so as to be axially displaced. The optical sensor is responsive to the axial displacement of the probe to provide a signal indicative of establishment of the engagement of the terminal connector with the terminal device.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for the purpose of explanation and understanding only.

In the drawings.

DESCRIPTION OF THE PREFERRED EMBODIMENT

Figure 1:
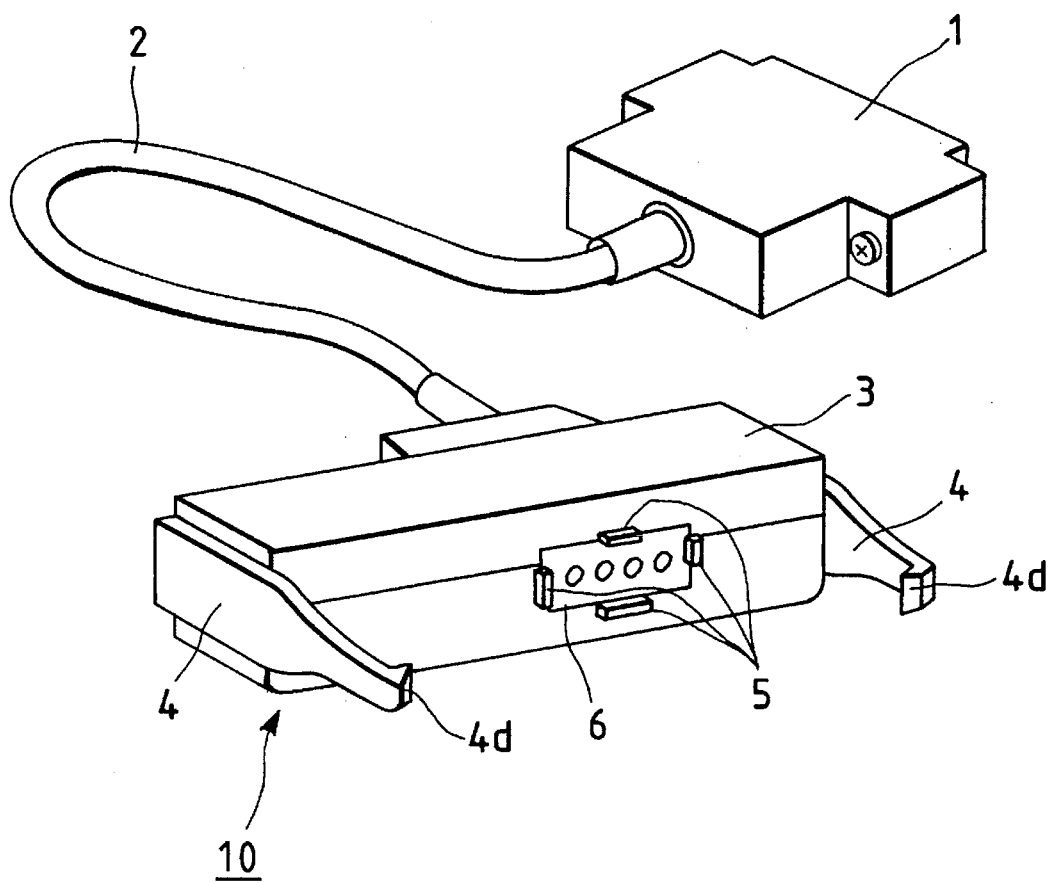
FIG. 1 is a perspective view which shows an optical connector apparatus according to the present invention.

Referring now to the drawings, wherein like numbers refer to like parts in several views, particularly to FIG. 1, there is shown an optical connector apparatus according to the present invention. The optical connector apparatus includes generally a host connector 1, a signal cable 2, and a terminal connector 10. The host connector 1 is designed to couple with a host computer. The terminal connector 10 is designed as an attachment to a portable terminal device 21, as shown in FIG. 2, and includes a pair of hooks 4 formed on both sides of a connector casing 3, four protrusions 5, and a filter 6 (working as an optical signal transmitting/receiving terminal). The protrusions 5 are arranged around the filter 6 in a diametrically opposed relation for aligning an optical axis of LEDs incorporated in the filter 6 of the terminal connector 10 with those of LEDs of a filter, as will be described later, of the terminal device 21.

Figure 2A:
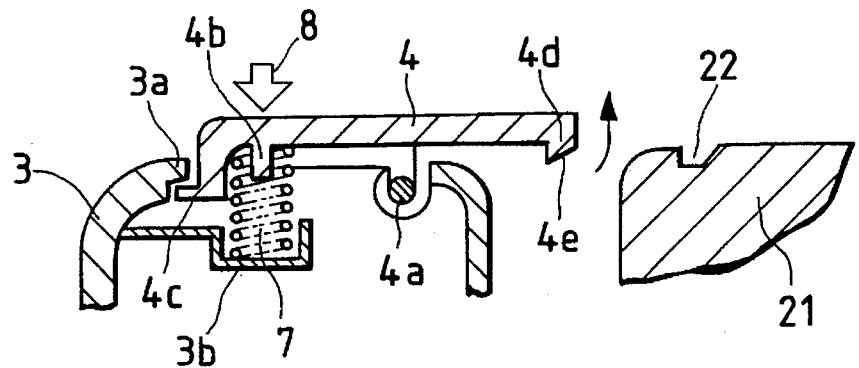
FIGS. 2(a), 2(b), and 2(c) are partial cross-sectional views which show the operation of a terminal connector when joined to a terminal equipment.
Figure 2B:
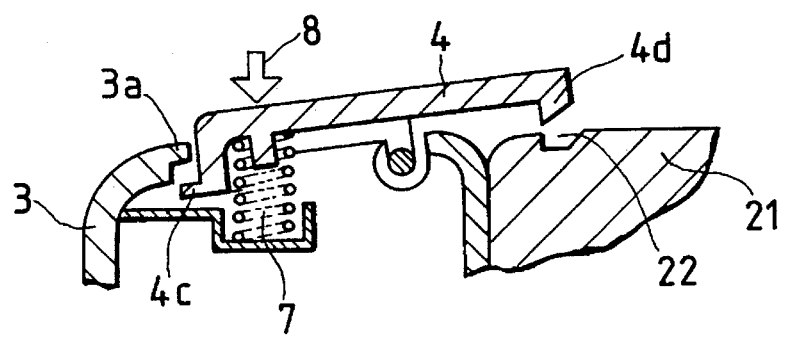
Figure 2C:
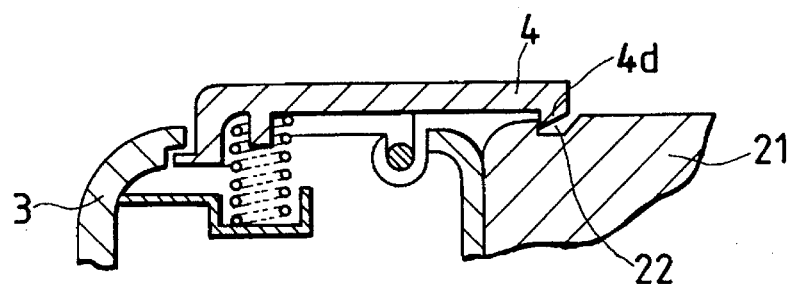

Each hook 4, as shown in FIGS. 2(a), 2(b), and 2(c), includes a shaft 4a, a boss 4b, a stopper portion 4c, and a barbed portion 4d. The shaft 4a is retained by an inner wall of the connector casing 3 so as to allow the hook 4 to pivotably rotate. A compression coil spring 7 is disposed between the boss 4b and a spring seat 3b formed on the inner wall of the connector casing 3 for constantly urging a portion of the connector casing 3 around the boss 4b outward, while the stopper portion 4c engages a shoulder portion 3a formed on an opening end of the side wall of the connector casing 3 against a spring force of the coil spring 7 to maintain the hook 4 substantially parallel to the side surface of the connector casing 3. The barbed portion 4d is formed on an end of the hook 4 for tight engagement with a recessed portion 22 formed in an outer wall of a portable terminal device 21. Instead of the coil spring 7, a torsion coil spring may be used.

In operation, when the terminal connector 10 is jointed to a socket portion of the terminal device 21, a force 8 is, as shown in FIG. 2(a), first applied to each hook 4 against the spring force of the coil spring 7, so that it rotates, as shown in FIG. 2(b), about the shaft 4a in the counterclockwise direction, as viewed in the drawing, thereby allowing the barbed portion 4d to engage the recessed portion 22 of the terminal device 21. Subsequently, the force 8 is, as shown in FIG. 2(c), released to establish tight engagement between the terminal connector 10 and the socket portion of the terminal device 21 under the spring force of the coil spring 7. Each barbed portion 4d, as shown in the drawings, has a tapered surface 4e for guiding engagement of the barbed portion 4d with the recessed portion 22.

When the terminal connector 10 is separated from the terminal device 21, the force 8 is, similar to the above, applied to each hook 4 to release the engagement of the barbed portion 4d with the recessed portion 22 of the terminal device 21, the terminal connector 10 being pulled out of the socket portion of the terminal device 21.

As appreciated from the above, the optical connector apparatus of the invention eliminates the need for magnetic force to connect the terminal connector with the terminal device, thereby eliminating the possibility of floppy discs or memory cards being broken under the influence of the magnetic force. Additionally, since the optical connector apparatus of this invention has no permanent magnet, it can be easily assembled without metallic component parts such as screws or a screw driver being attracted thereto.

Figure 3:
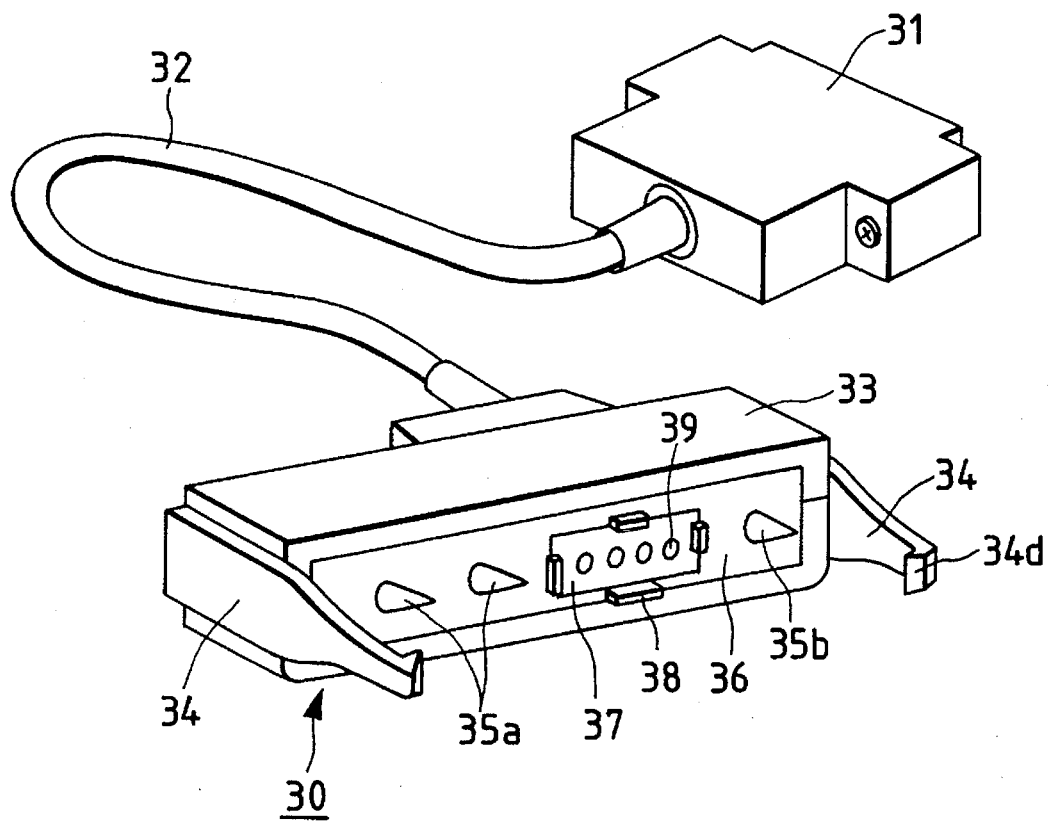
FIG. 3 is a perspective view which shows an optical connector apparatus according to an alternative embodiment of the invention.

Referring to FIG. 3, there is shown an optical connector apparatus according to an alternative embodiment of the invention.

Figure 4:
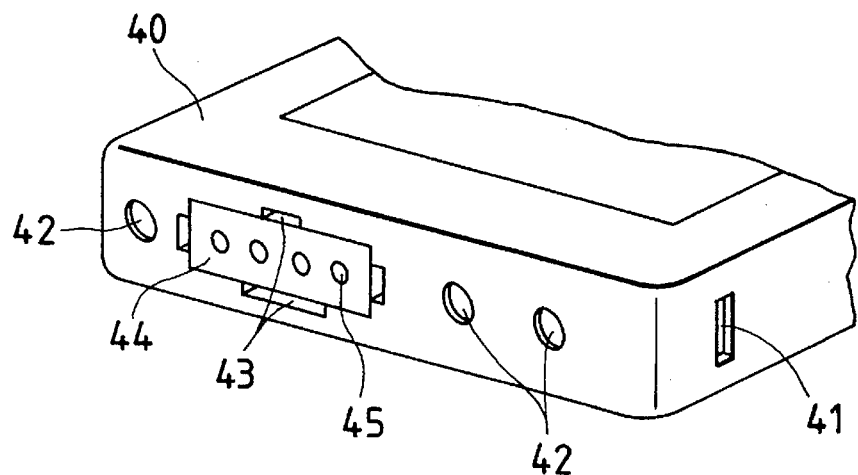
FIG. 4 is a partly perspective illustration which shows a socket of a terminal equipment.

The optical connector apparatus of this embodiment includes a host connector 31, a signal cable 32, and a terminal connector 30. The terminal connector 30 includes a pair of hooks 34 formed on both sides of a connector casing 33, a pair of charging probes 35a, a sensor probe 35b, a probe housing 36, a filter 37, and four protrusions 38. The hooks 34 are essentially identical to the ones of the first embodiment, and have barbed portions 34d engaging recessed portion 41 formed on both sides of a socket portion of a terminal device 40 shown in FIG. 4. Each charging probe 35a functions as a charging terminal for power supply from the host computer to the terminal device 40, and is made of a pointed metallic bar for assuring stability of electric connection to a mated terminal 42 (i.e., a receptacle) of the terminal device 40. The charging probes 35a may alternatively be formed with a folded metallic plate having part thereof sharpened for stability of contact with the terminals 42. The protrusions 38, when the terminal connector 30 is joined to the terminal device 40, are fitted into grooves 43 for opposing the filter 37 to a filter 44 so that optical axes of optical conductive holes 39 (i.e., LEDs 70 shown in FIG. 6) may be aligned with optical axes of optical conductive holes 45 (i.e., LEDs 80) of the terminal device 40.

Figure 5A:
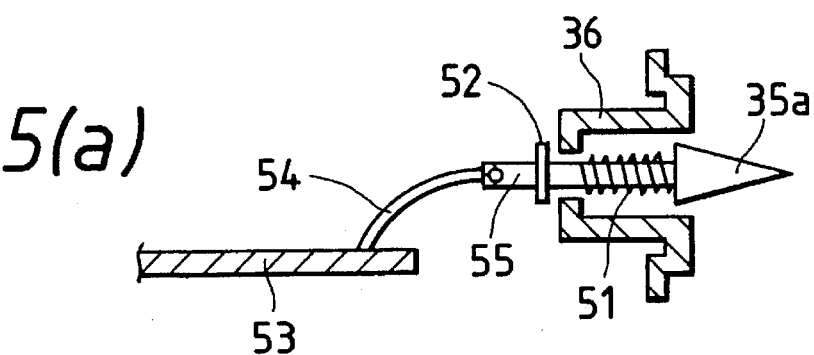
FIGS. 5(a), 5(b), and 5(c) are partial cross-sectional views which show the operation of the terminal connector shown in FIG. 3 when joined to a terminal equipment.

Each charging probe 35a is, as shown in FIG. 5(a), spring-loaded by means of a coil spring 51 within a chamber formed in the probe housing 36, and includes a shaft 55 and a flange 52. The flange 52 serves as a stopper for restricting an axial displacement of the charging probe 35a biased by the coil spring 51. Each charging probe 35a is electrically connected to a circuit board 53 through a lead wire 54 for power supply to the terminal device 40.

Figure 5B:
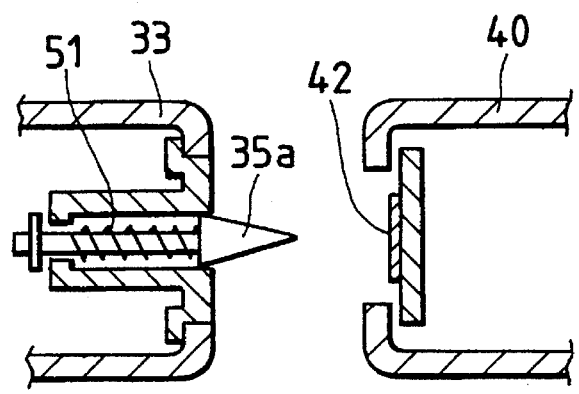
Figure 5C:
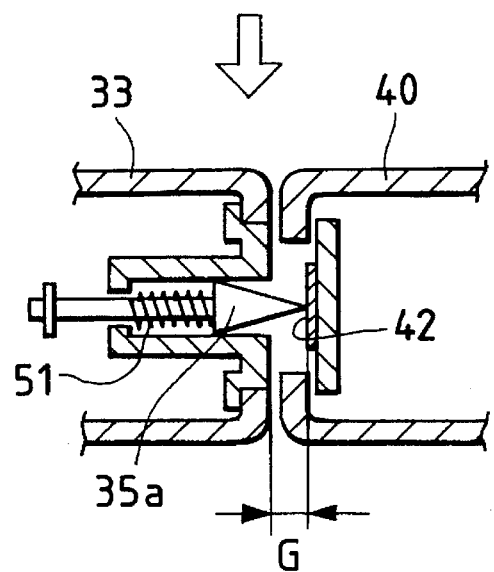
Figure 6:
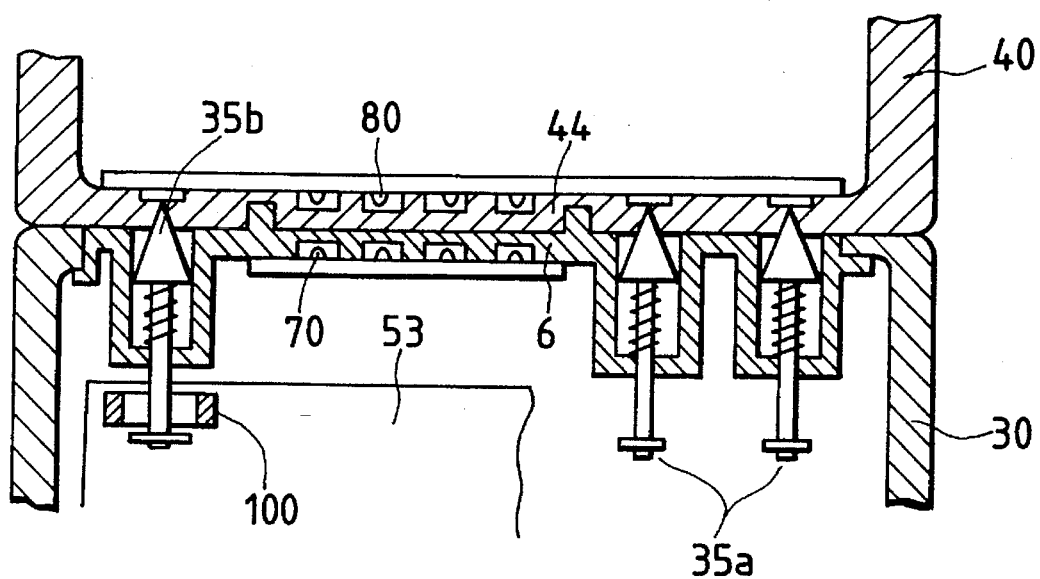
FIG. 6 is a partly cross-sectional view which shows a charging probe pair and a probe functioning as a sensor for monitoring engagement of a terminal connector and a terminal device.

Each charging probe 35a, as shown in FIG. 5(b), projects from the end surface of the connector casing 33. The mount of the projection is determined by a position of the stopper 52 on the shaft 55. The connection between the terminal connector 30 and the terminal device 40 is, similar to the first embodiment, accomplished by engaging each hook 34 with the recessed portion 41 formed in the side of the terminal device. Each charging probe 35a is then pressed against the corresponding charging terminal 42 so that the coil spring 51 is compressed, thereby applying a reaction force to the charging terminal 42. This reaction force works as a contacting load between the charging probe 35a and the corresponding charging terminal 42 and also serves, as shown in FIG. 5(c), to maintain a clearance between the connector casing 33 and the terminal device at a constant value G when the hooks 34 engage the recessed portions 41 completely, as shown in FIG. 6.

As apparent from the above, the stable connection between each charging probe 35a and the corresponding charging terminal 42 is established by the spring load produced by the coil spring 51. This arrangement gives the optical connector apparatus a charging function without use of a special charging unit.

Figure 7:
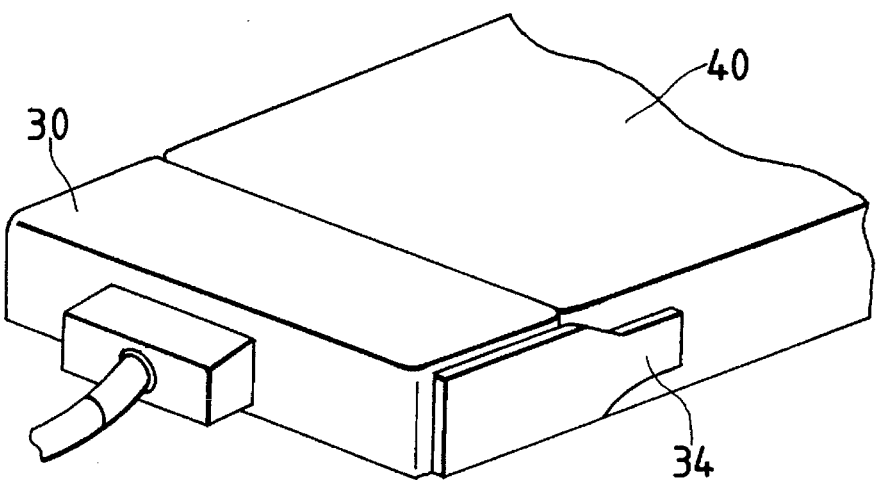
FIG. 7 is a partly perspective view which shows a terminal connector joined to a terminal device.
Figure 8:
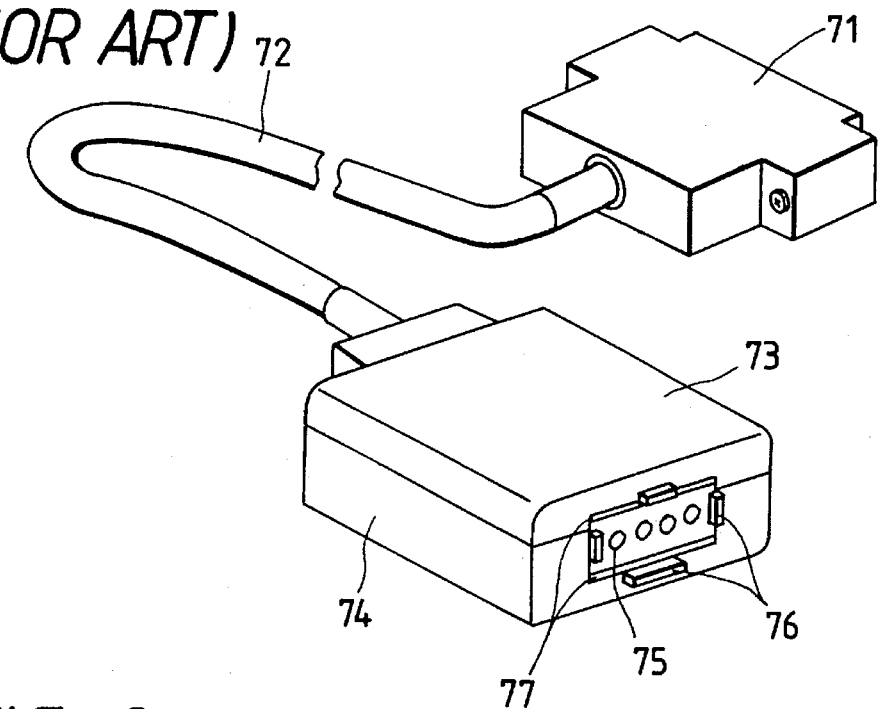
FIG. 8 is a perspective view which shows a conventional optical cable connector.
Figure 9:
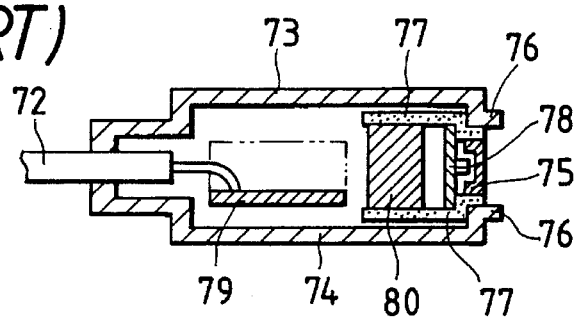
FIG. 9 is a cross-sectional view which shows a terminal connector of a conventional optical cable connector.
Figure 10:
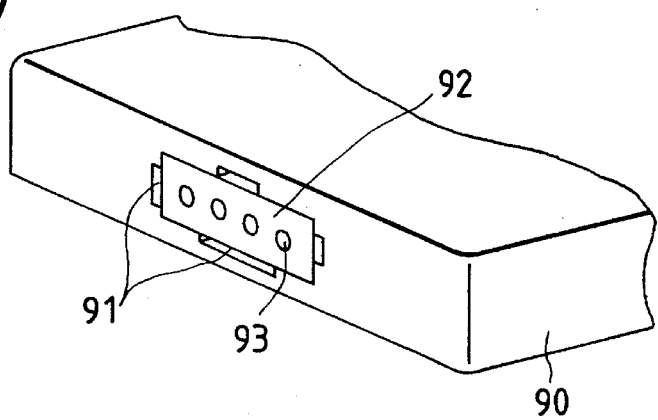
FIG. 10 is a partly perspective view which shows a socket portion of a terminal device to which a conventional terminal connector is joined.

Referring to FIG. 7, the sensor probe 35b has substantially the same structure as that of the charging probes 35a, but it is designed to be inserted at its end into an optical sensor 100 when the terminal connector 30 engages the terminal device 40 completely. The optical sensor 100 is electrically connected to the circuit board 53 and is responsive to the insertion of the sensor probe 35b to provide a signal indicative of complete engagement of the terminal connector 30 with the terminal device 40 to the host computer. The host computer is responsive to this signal to start power supply to the terminal device 40.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. An optical connector apparatus comprising:

a host connector connectable to a host device;

a signal cable including at least one optical waveguide connected to said host connector; and a terminal connector connected to said host connector through said signal cable, said terminal connector being designed to be joined to a terminal device and including a casing having formed thereon hook means for establishing engagement with the terminal device, said hook means having a barbed portion projecting from the casing of said terminal connector to engage a recessed portion projecting from the casing of said terminal connector to engage a recessed portion formed in the terminal device, and being supported pivotably about a shaft secured to a side of the casing, an end of the hook means being urged by a spring outward of the casing and including a stopper portion engaging a side wall of the casing to restrict pivotal movement of the hook means.

2. An optical connector apparatus comprising:

a host connector connectable to a host device;

a signal cable including at least one optical waveguide connected to said host connector;

a terminal connector connected to said host connector through said signal cable, said terminal connector being designed to be joined to a terminal device and including a casing having formed thereon hook means for establishing engagement with the terminal device; and probes working as charging terminals, each probe being elastically supported by the casing of the terminal connector so as to allow axial displacement for establishing engagement with charging terminals of the terminal equipment under a given degree of contact pressure.

3. An optical connector apparatus as set forth in claim 2, wherein each probe includes a pointed portion, a shaft, and a stopper portion formed on an end of the shaft, the pointed portion being urged by a spring outward of the casing, while the stopper portion restricts outward axial displacement of the pointed portion so as to at least partly project the pointed portion from the casing.

4. An optical connector apparatus as set forth in claim 2, further comprising sensor means for detecting the engagement of the terminal connector with the terminal device.

5. An optical connector apparatus as set forth in claim 4, wherein said sensor means is provided with a probe and an optical sensor, the probe being supported by the casing so as to be axially displaced, the optical sensor being responsive to the axial displacement of the probe to provide a signal indicative of establishment of the engagement of the terminal connector with the terminal device.

6. An optical connector apparatus comprising:

a host connector connectable to a host device;

a signal cable including at least one optical waveguide connected to said host connector; and a terminal connector connected to said host connector through said signal cable, said terminal connector being designed to be joined to a terminal device and including a casing having formed thereon hook means for establishing engagement with the terminal device, said hook means having formed on both sides of the casing of the terminal connector a pair of hook members supported pivotally about shafts secured to the sides of the casing, each of the hook members having an end urged by a spring outward of the casing and including a stopper portion engaging a side wall of the casing to restrict pivotal movement of the hook member.

7. An optical connector apparatus comprising:

a host connector connectable to a host device;

a terminal connector connected to said host connector through a signal cable including at least one optical waveguide, said terminal connector being designed to be joined to a terminal device and including a casing having formed thereon hook means for establishing engagement with the terminal device, said hook means being supported pivotably about a shaft secured to a side of the casing, an end of the hook means being urged by a spring outward of the casing and including a stopper portion engaging a side wall of the casing to restrict pivotal movement of the hook means; and protrusions formed on an end surface of the casing of the terminal connector to align an optical signal transmitting/receiving terminal of the terminal connector with an optical signal transmitting/receiving terminal of the terminal device.

8. The optical connector apparatus of claim 7 further comprising engaging means on a second end of said hook members for engaging said terminal device.

* * * * *